No. 842,512. PATENTED JAN. 29, 1907.
W. K. ASHINHURST.
VEHICLE BRAKE.
APPLICATION FILED NOV. 8, 1905.

Witnesses
Inventor
W. K. Ashinhurst
Attorneys

UNITED STATES PATENT OFFICE.

WILLIAM K. ASHINHURST, OF BIBB, TEXAS.

VEHICLE-BRAKE.

No. 842,512.  Specification of Letters Patent.  Patented Jan. 29, 1907.

Application filed November 8, 1905. Serial No. 286,372.

*To all whom it may concern:*

Be it known that I, WILLIAM KENNEDY ASHINHURST, a citizen of the United States, residing at Bibb, in the county of Comanche, State of Texas, have invented certain new and useful Improvements in Vehicle-Brakes; and I do hereby declare the following to be a full, clear, and exact description of the invention, such as will enable others skilled in the art to which it appertains to make and use the same.

This invention relates to vehicle-brakes, and has for its object to provide a simple and inexpensive device of this nature in which the brake-shoes may be readily applied to the wheels.

With the above and other objects in view the invention consists in the construction and arrangement of parts shown in the accompanying drawings, in which—

Figure 1:
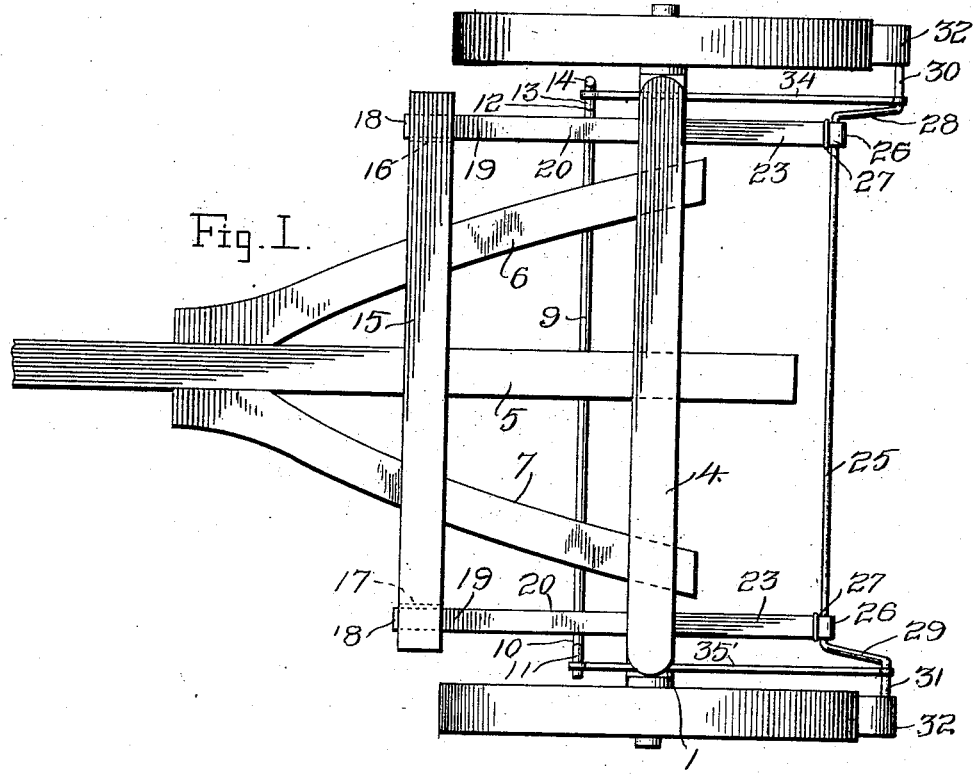
Figure 2:
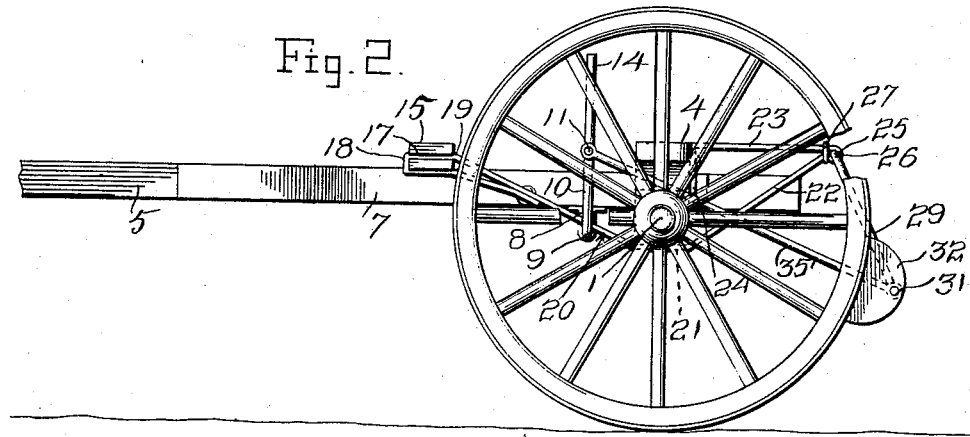

Figure 1 is a plan view of my invention, and Fig. 2 is a side elevation of the same.

Referring to the drawings, the reference-numeral 1 designates the axle of a vehicle, 4 the bolster, and 5 the tongue of the same. Disposed upon each side of the tongue 5 are the usual braces 6 and 7, which are each provided with depending brackets 8, arranged in alinement to support a rock-shaft 9. One end of the rock-shaft 9 is bent upwardly, as at 10, and then outwardly, as at 11, and its other end bent upwardly, as at 12, and outwardly, as at 13, after which it is again bent upwardly to form an operating-lever 14.

Secured to the upper faces of the braces 6 and 7 is a cross-piece 15, having its ends bifurcated, as at 16 and 17, for the reception of the bight portions 18 of the forward ends 19 of brackets 20, each of which extends beneath the axle 1, as at 21, and thence upwardly and rearwardly, as at 22, when it is directed forwardly, as at 23, for attachment to the rear side of the bolster 4. The extreme ends 24 of the brackets 20 are secured against the rear side of the bolster 4.

A brake-beam 25 is mounted to rock in the bight portions 26, formed by bending the portion 23 to extend at an angle to the portion 22, and suitable rings 27 are engaged around the said portions to prevent displacement of the said brake-beam. The end portions of the brake-beam 25 are turned downwardly and have their extreme end portions turned laterally, as at 30 and 31, brake-shoes 32 being mounted upon the said ends.

Connecting-rods 34 and 35' are connected at one of their ends to the portions 13 and 11 of the rock-shaft 9, respectively, and at their other ends to the portions 30 and 31 of the brake-beam 25, so that when the rock-shaft 9 is rocked by means of the lever 14, the brake-beam 25 will be also rocked to bring the brake-shoes 32 into braking contact with the wheels of the vehicle.

What is claimed is—

In a vehicle-brake, the combination with a vehicle-pole, an axle, a bolster and braces associated with said pole and said axle and bolster, of a beam disposed upon said pole and said braces, brackets connected at one of their ends to said beam, said brackets extending downwardly and rearwardly beneath said axle and having their rear end portions bent upon themselves to form eyes, a rock-shaft mounted upon said braces, a brake-beam mounted in said brackets, and connections between said rock-shaft and said brake-beam for rocking the latter.

In testimony whereof I affix my signature in presence of two witnesses.

W. K. ASHINHURST.

Witnesses:
 E. E. MILNER,
 PITT MILNER.